No. 12,657. REISSUED JUNE 4, 1907.
C. C. JACOBS.
FRICTION CLUTCH.
APPLICATION FILED FEB. 24, 1904.
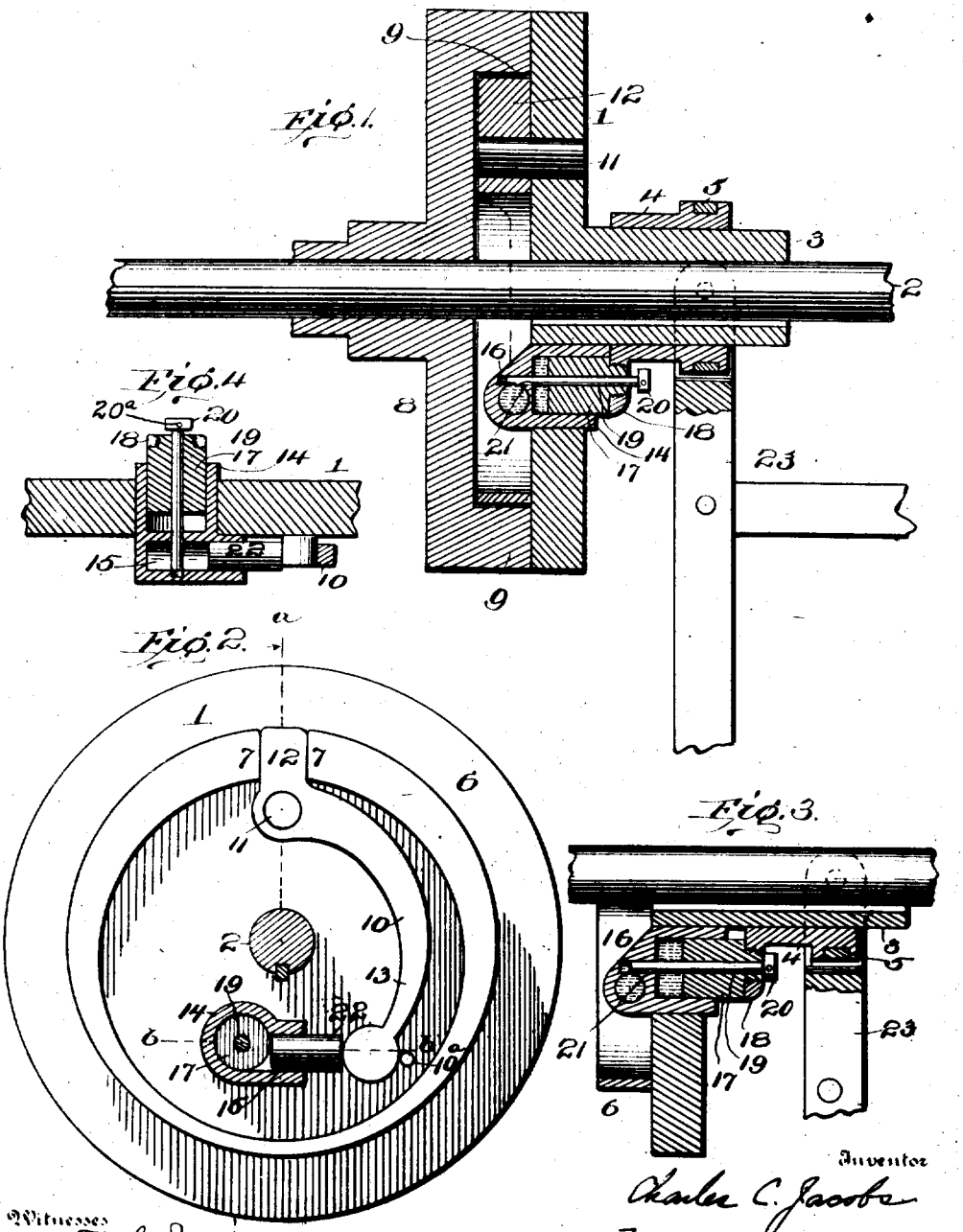
Witnesses
J. M. Fowler Jr.
J. M. Copenhaver
Inventor
Charles C. Jacobs
By Dick, Doyle & Regan
Attorneys

UNITED STATES PATENT OFFICE.

CHARLES C. JACOBS, OF AKRON, OHIO, ASSIGNOR, BY DIRECT AND MESNE ASSIGNMENTS, TO HOMER D. WELLS, OF AKRON, OHIO.

FRICTION-CLUTCH.

No. 12,657. Specification of Reissued Letters Patent. Reissued June 4, 1907.

Original No. 688,309, dated December 10, 1901. Application for reissue filed February 24, 1904. Serial No. 195,131.

*To all whom it may concern:*

Be it known that I, CHARLES C. JACOBS, a citizen of the United States, residing at Akron, in the county of Summit and State of Ohio, have invented a new and useful Friction-Clutch, of which the following is a specification.

My invention is an improved friction-clutch; and it consists in the peculiar construction and combination of devices hereinafter fully set forth and claimed.

In the accompanying drawings, Figure 1 is a sectional view of a friction-clutch embodying my improvements the section being on the line *a—a* of Fig. 2. Fig. 2 is a similar view taken on a plane at right angles to Fig. 1. Fig. 3 is a detail sectional view showing the plunger in a different position from that shown in Fig. 1. Fig. 4 is a detail sectional view taken on a plane indicated by the line *b b* of Fig. 2.

In the embodiment of my invention the clutch member 1, which is keyed on the shaft 2, is in the form of a circular disk and is provided on its outer side with a tubular extended hub 3, on which is adapted to slide a sleeve 4, which is provided with an annular groove 5. On the inner side of the clutch member 1 is a divided or split expansible friction-ring 6, the outer side of which is normally concentric with the shaft 2. This split or divided ring may be of any preferred form, but is here shown as having the ends thereof thickened or widened, as at 7, to form bearing-surfaces. The clutch member 8 is loose on the shaft 2 and is provided on its inner side with an annular flange 9. The said clutch member 8 forms a casing which incloses the friction-ring 6, and the inner side of the flange 9 of said clutch member coacts with said friction-ring in the manner hereinafter described so that when the ends of the said divided friction-ring are moved outward from each other the said ring is expanded and by frictional contact with the flange 9 locks the clutch member 8 to the member 1, and hence causes the same to rotate with the shaft, as will be understood.

A lever 10 is fulcrumed on a stud 11, which projects from the inner side of the fast clutch member 1 at a point opposite the divided ends of said friction-ring and within said ring. The said lever is preferably of the form here shown, but may be modified in form, and is provided with a short arm 12, which is disposed between the ends 7 of the ring 6 and contacts therewith and a relatively long arm 13.

A cylinder 14 is secured in an opening in the clutch member 1, and at the inner end of said cylinder 14 and at right angles thereto is a cylinder 15. A port or channel 16 establishes communication between the inner ends of said cylinders. The outer ends of said cylinders are open. In the cylinder 14 is fitted a piston or plunger 17, the axis of which is parallel with that of the shaft 2. The outer end of said plunger or piston 17 is secured to the sleeve 4, said piston or plunger being movable with said sleeve. In the form of my invention here shown the said sleeve is provided on one side with a lug or ear 18, having a threaded opening which is engaged by a threaded extension on the outer end of the piston or plunger 17. The cylinders 14 and 15, while here shown and hereinbefore described as being formed separately from the clutch member 1, may be formed integrally therewith, as will be understood, and I do not limit myself in this particular. A valve 19, which is here shown in the form of a cylindrical rod, extends through a longitudinal bore, with which the piston or plunger 17 is provided. Said valve has at its outer end a head 20 with an opening $20^a$ therein for the reception of an adjusting-pin used in initially adjusting the valve, and the inner portion of said valve fits snugly in the channel 16, which connects the cylinders 15 and 14. The said valve is provided with a port 21, which when the valve is adjusted establishes communication between the cylinders, so that fluid can pass from one to the other. In the cylinder 15 is a piston or plunger 22, which is adapted to engage the outer end of the long arm of the lever 10. When the fast member 1 is disconnected from the loose member 8, the piston 17 is moved inward in the cylinder 14, and the plunger 22 is moved outward in the cylinder 15 and maintained in position by the pressure of the fluid, the plunger 22 engaging the lever 10 and holding the latter against the stop-pin $10^a$ in the position shown in Fig. 2 of the drawings, in which position of the lever its arm 12 is radial, and the friction-ring is circular and concentric with the flange 9 of member 8.

In order to lock the loose member 8 to the fast member 1, the sleeve 4 is moved outward from the member 1 by the lever 23, thereby drawing the piston 17 outward in the cylinder 14, and hence releasing pressure from the inner side of the plunger 22, the latter thereby freeing the lever 10. The latter, being connected with the member 1 through pivot pin 11, rotates therewith and carries with it the split-ring 6, but as said split-ring is loosely disposed within the flange 9, the frictional contact between said ring and flange, slight as it may be, will necessarily retard said split-ring to some extent, thereby causing a corresponding rotation of the lever 10 on its pivot 11. Now, inasmuch as any movement of the arm 12 of said lever out of the true radial position necessarily spreads apart the ends of split-ring 6, it will be seen that this movement causes said split-ring to immediately spread and engage the flange 9 of member 8, thus locking the parts together and causing member 8 to revolve with member 1.

It will be apparent that as the clutch is put in operation automatically by the resistance offered by the flange 9 to the rotation of split-ring 6, and as the greater the load imposed upon member 8, the harder it will be to start said member, it follows that the more the flange 9 retards split-ring 6, the more firmly the latter will grip said flange. Thus the holding or gripping power of the clutch will increase and decrease automatically with the load imposed upon member 8.

My improved clutch is self-adjusting to any load, requires no attention when in operation, cannot slip under any stress, and will not bind or stick when out of action.

By means of the valve 16 communication can be regulated between the cylinders 14, 15 to control the passage of fluid from one to the other.

Having thus described my invention, I claim:

1. In a friction-clutch, the combination of a fast member and a loose member, having an annular flange, a lever pivotally connected to said fast member, an expansible friction-ring within said annular flange and engaged, and adapted to be expanded by said lever, a pair of communicating cylinders, plungers therein, one of said plungers engaging and adapted to operate said lever, means to move the other plunger mechanically, and a valve to establish and cut off communication between the said cylinders at will, whereby fluid under compression may be caused to circulate between the said cylinders, for the purpose set forth, substantially as described.

2. In a friction-clutch, the combination of the members, one fast and the other loose, a friction mechanism to lock said members together, a pair of communicating cylinders, plungers therein, one of said plungers being adapted to operate said friction mechanism, means to move the other plunger mechanically, and a valve to establish and cut off communication between the said cylinders at will, whereby fluid under compression may be caused to circulate between the said cylinders, for the purpose set forth, substantially as described.

3. In a friction-clutch, the combination of a fast member, a lever pivoted thereon and carried thereby, a stop to limit the movement of said lever in one direction, an expansible friction-ring loosely disposed on said fast member, said ring and said lever being so constructed that the latter, when moved on its pivot, will expand said friction-ring, a loose member adapted to be engaged by said friction-ring, when the latter is expanded, and means to maintain said lever in engagement with said stop and to release it therefrom at will, for the purpose set forth, substantially as described.

4. In a friction-clutch, the combination of a fast member, a lever pivoted thereon and carried thereby, a stop to limit the movement of said lever in one direction, an expansible friction-ring loosely disposed on said fast member, said ring and said lever being so constructed that the latter, when moved on its pivot, will expand said friction-ring, a loose member adapted to be engaged by said friction-ring when the latter is expanded and a fluid-pressure mechanism carried by said fast member to maintain said lever in engagement with said stop and release it therefrom at will, for the purpose set forth, substantially as described.

5. In a friction-clutch, the combination of a fast member, a lever pivoted thereon, and carried thereby, a stop to limit the movement of said lever in one direction, an expansible friction-ring, loosely disposed on said fast member, said ring and said lever being so constructed that the latter when moved on its pivot will expand said friction-ring, a loose member adapted to be engaged by said friction-ring when the latter is expanded and a fluid-pressure mechanism carried by said fast member, said fluid-pressure mechanism comprising a pair of fluid-containing cylinders having a contracted passage between them, plungers in said cylinders, one of said plungers engaging said lever, and means to move the other plunger mechanically, said fluid-pressure mechanism maintaining said lever in engagement with said stop and serving to release it therefrom at will, for the purpose set forth, substantially as described.

6. In a friction clutch, the combination with a fast member, of a loose member, an expansible friction ring loosely disposed between the two and having slight frictional engagement with one of said members, a ring expanding lever pivoted to the other member and serving to transmit rotative movement to the ring, said ring when retarded by friction moving the lever to effect expansion of the ring and the frictional locking of the two members, and means for maintaining the lever in inoperative position and movable from engagement with the lever to permit operation of the latter.

7. In a friction clutch, the combination with a fast member, of a loose member, an expansible friction ring loosely disposed between the said members and having slight frictional engagement with one of them, a ring expanding lever pivoted to the other member, means for holding said lever from turning on its pivot during transmission of rotative movement to the ring and movable from engagement with the lever to permit operative movement of the latter, said ring when retarded by friction moving the lever to effect expansion of the ring and frictional locking of the two members.

In testimony that I claim the foregoing as my own, I have hereto affixed my signature in the presence of two witnesses.

CHARLES C. JACOBS

Witnesses:

E. E. ANDREWS,

DAYTON A. DOYLE.